United States Patent
Lewis et al.

(10) Patent No.: US 9,705,945 B1
(45) Date of Patent: Jul. 11, 2017

(54) DECORATING EMBEDDED GRAPHIC REPRESENTATIONS ON SOCIAL SHARES WITH METADATA

(71) Applicant: Google inc., Mountain View, CA (US)

(72) Inventors: Justin Lewis, Marina del Rey, CA (US); Ruxandra Georgiana Paun, Santa Monica, CA (US)

(73) Assignee: Google Inc., Mountain View, CA (US)

( * ) Notice: Subject to any disclaimer, the term of this patent is extended or adjusted under 35 U.S.C. 154(b) by 213 days.

(21) Appl. No.: 14/153,711

(22) Filed: Jan. 13, 2014

(51) Int. Cl.
  *G06F 15/16* (2006.01)
  *H04L 29/06* (2006.01)
  *G06Q 50/00* (2012.01)

(52) U.S. Cl.
  CPC ........... *H04L 65/403* (2013.01); *G06Q 50/01* (2013.01)

(58) Field of Classification Search
  None
  See application file for complete search history.

(56) References Cited

U.S. PATENT DOCUMENTS

| | | | |
|---|---|---|---|
| 8,572,129 B1 | 10/2013 | Lee | |
| 9,083,997 B2 * | 7/2015 | Harwell | H04N 21/2408 |
| 2011/0010386 A1 * | 1/2011 | Zeinfeld | G06F 19/322 |
| | | | 707/769 |
| 2011/0066506 A1 * | 3/2011 | Sung | G06Q 30/02 |
| | | | 705/14.66 |
| 2011/0246560 A1 * | 10/2011 | Gibson | G11B 27/105 |
| | | | 709/203 |
| 2012/0030586 A1 | 2/2012 | Ketkar | |
| 2012/0036524 A1 * | 2/2012 | Mugulavalli | H04N 21/258 |
| | | | 725/9 |
| 2012/0038665 A1 * | 2/2012 | Strietzel | G09G 5/377 |
| | | | 345/629 |
| 2012/0054275 A1 * | 3/2012 | Channell | G06Q 30/0278 |
| | | | 709/204 |
| 2012/0054278 A1 * | 3/2012 | Taleb | G06Q 50/01 |
| | | | 709/204 |
| 2012/0226769 A1 * | 9/2012 | Basso | H04N 21/2408 |
| | | | 709/217 |
| 2013/0091582 A1 * | 4/2013 | Chen | G06Q 10/10 |
| | | | 726/26 |
| 2013/0174035 A1 | 7/2013 | Grab | |
| 2013/0198204 A1 * | 8/2013 | Williams | G06F 17/30283 |
| | | | 707/748 |
| 2013/0224705 A1 * | 8/2013 | Skelton | G09B 19/00 |
| | | | 434/238 |
| 2014/0052539 A1 * | 2/2014 | Lauback | G06Q 30/0255 |
| | | | 705/14.66 |
| 2014/0068677 A1 * | 3/2014 | Rimon | H04N 21/458 |
| | | | 725/46 |

(Continued)

*Primary Examiner* — Joseph E Avellino
*Assistant Examiner* — Phyllis A Book
(74) *Attorney, Agent, or Firm* — Lowenstein Sandler LLP

(57) ABSTRACT

Decorating embedded graphic representations on social shares with metadata is performed. A request is received by a content sharing platform from a social network for a representation of a content item. The representation of the content item is to be included in a social share on the social network. Current statistical information associated with the content item is identified. The representation of the content item and data indicative of the current statistical information associated with the content item is provided to the social network.

20 Claims, 6 Drawing Sheets

(56) References Cited

U.S. PATENT DOCUMENTS

2014/0143228 A1* 5/2014 Blue ............... G06F 17/30867
707/709
2015/0058757 A1* 2/2015 Tseng ..................... H04L 51/32
715/758

* cited by examiner

DECORATING EMBEDDED GRAPHIC REPRESENTATIONS ON SOCIAL SHARES WITH METADATA

TECHNICAL FIELD

Embodiments of the present disclosure relate to the field of social networking services and, more particularly, to a method for decorating embedded graphic representations on social shares with metadata.

BACKGROUND

On the Internet, social networks allow users to connect to and share information with each other. Many social networks include a content sharing aspect that allows users to upload, view, and share content, such as video content, image content, audio content, and so on. Other users of the social network may comment on the shared content, discover new content, locate updates, share content, and otherwise interact with the provided content. The shared content may include content from professional content creators, e.g., movie clips, TV clips, and music videos, as well as content from amateur content creators, e.g., video blogging and short original videos.

Currently, users are spending increased amounts of time on content sharing platforms. "Sharing" of content items between users of the content sharing platform and with users of other social networks is important for driving views of content items of the content sharing platform, starting viewing sessions on the content sharing platform, and increasing watch time of content items on the content sharing platform. Sharing refers to a user of the content sharing platform promoting and/or endorsing a content item to another user of the content sharing platform or of another social network for viewing purposes.

Often a user decides whether to consume (e.g., view, listen, etc.) a content item based on metadata (e.g., statistics) about the consumption of the content item by other users, such as the number of times the content item has been viewed or the number of times the content item has been liked or given a positive rating. However, content items shared via a social network typically are not presented with information about the consumption of the content item that is up-to-date, such as the current number of views or the current number of likes.

SUMMARY

In one embodiment, a method for decorating embedded graphic representations on social shares with metadata is performed. A request is received by a content sharing platform from a social network for a representation of a content item. The representation of the content item is to be included in a social share on the social network. Current statistical information associated with the content item is identified. The representation of the content item and data indicative of the current statistical information associated with the content item is provided to the social network.

In additional embodiments, computing devices for performing the operations of the above described embodiments are also implemented. Additionally, in embodiments of the disclosure, a computer readable storage media stores methods for performing the operations of the above described embodiments.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
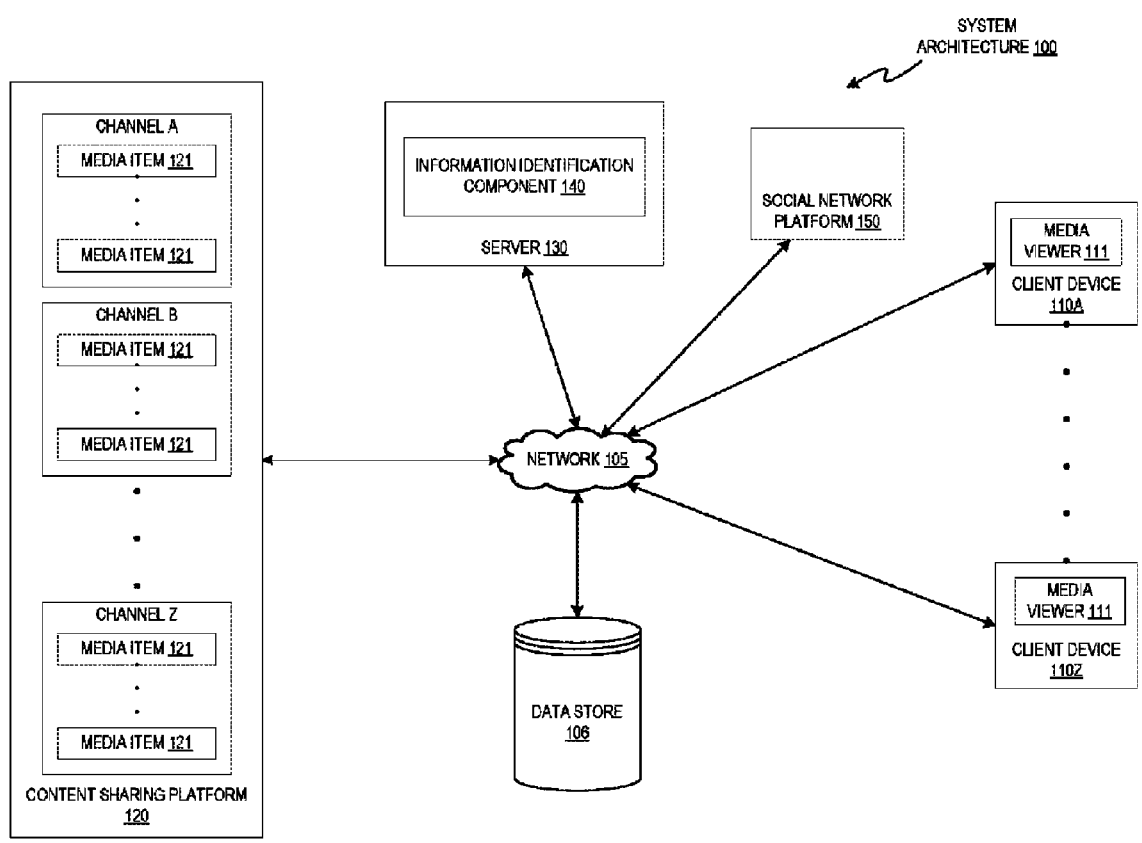
FIG. 1 illustrates an example system architecture, in accordance with one embodiment of the present disclosure.

On content hosting and sharing platforms ("content sharing platforms"), users can see metadata (e.g., current statistical information) about a content item, such as the number of views and likes the content item has, before they choose to watch it. The metadata helps users filter through the possibly large amount of content available on the content sharing platform. For many users, a high view count or a high like count is a deciding factor between selecting one content item over another content item.

The metadata about the content item may not be included in a social share when the content item is shared on a social network. Therefore, the user may not be able to see the metadata upon viewing the social share. In order to see the metadata, the user of the social network will instead have to click through to watch the content item directly on the content sharing platform. For example, user A views video B that has a very high view count, and enjoys video B so much that user A decides to post video B to user A's social network page. When user C, who loves to see the latest popular videos, goes to the social network, user C sees user A's post. When user C sees user A's post about video B, user C will not know that the video is popular because the high view count for video B is not included in user A's post, and therefore user C decides not to watch video B. If the view count had been included in the post, user C may have watched video B when user C saw the very high view count for it. In another example, user A views video B that has a low view count but enjoys video B and posts video B to user A's social network page. A few days later, video B goes viral and the number of views for video B becomes very high. User C may not have watched the video upon visiting the social network on the day that user A posted video B (because of the low view count), but after a few days, would likely watch video B when the view count becomes very high.

Embodiments of the disclosure pertain to decorating embedded graphic representations on social shares with metadata. A social share can be a comment, a post, or any other content shared (e.g., promoted or endorsed) by a user of the social network with one or more other users of this or other social network and presented in a social network UI. The embedded graphic representation can be a thumbnail of the content item (e.g., an image, a video, etc.) embedded in a social share on a social network. A request is received by a content sharing platform from a social network for a representation of a content item. As described above, conventionally, when the social network obtains the representation of the content item, that representation typically does not include any current statistical information about the content item. At best, conventionally, the social network can include a snapshot of the statistical information at the time when a social post that includes the content item was created.

Embodiments of the present disclosure identify current statistical information associated with the content item, such as the current number of views or the current number of likes for the content item. In some embodiments, a response to the request includes data indicative of the current statistical information for the content item, and the response is provided to the social network by the content sharing platform. A better user experience is provided by the social network by causing the social network to display current statistical information for the content item because the experience more closely resembles the user experience on the content sharing platform. Moreover, the user decision to watch the content item may be easier to make when the current statistical information is provided and could cause an increase in the number of social network users who will consume content items associated with the content sharing platform. Sharing content items can be a large percent of traffic on the content sharing platform. By causing the current statistical information to be provided, a user may consume the content item, which might lead to further sharing of the content item, which might in turn lead to more views and more sharing of the content item. Moreover, when a user clicks on a content item in the social network, the social network may track those clicks and use them to improve feed ranking. The improved feed ranking can cause posts on the social network that include the content item from the content sharing platform to rank higher than if the current statistical information was missing.

Accordingly, aspects of the present disclosure allow a user to view current statistical information, such as up-to-date view counts and rating information, for a content item on a social network. The user can be more likely to consume the shared content item because of the current statistical information and have accurate information in deciding whether to consume the content item.

FIG. 1 illustrates an example system architecture 100, in accordance with one implementation of the disclosure, for decorating embedded graphic representations on social shares with metadata. The system architecture 100 includes client devices 110A through 110Z, a network 105, a data store 106, a content sharing platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, netbook computers etc. In some implementations, client device 110A through 110Z may also be referred to as "user devices." Each client device includes a media viewer 111. In one implementation, the media viewers 111 may be applications that allow users to view content, such as images, videos, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application that allows users to view digital media items (e.g., digital videos, digital images, electronic books, etc.).

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that are downloaded from the server 130.

In general, functions described in one implementation as being performed by the content sharing platform 120 can also be performed on the client devices 110A through 110Z in other implementations if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), dislike, and/or comment on media items. The content sharing platform 120 may also include a website (e.g., a webpage) that may be used to provide a user with access to the media items.

The content sharing platform 120 may include multiple channels (e.g., channels A through Z). A channel can be data content available from a common source or data content having a common topic or theme. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel.

Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user.

Each channel may include one or more media items 121. Examples of a media item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as a media item or content item.

A media item 121 may be consumed via the Internet and/or via a mobile device application. For brevity and simplicity, an online video (also hereinafter referred to as a video) is used as an example of a media item 121 throughout this document. As used herein, "media," media item, " "online media item," "digital media," "digital media item," "content," and "content item" can include an electronic file that can be executed or loaded using software, firmware or hardware configured to present the digital media item to an entity. In one implementation, the content sharing platform 120 may store the media items 121 using the data store 106.

In one implementation, the server 130 may be one or more computing devices (e.g., a rackmount server, a server computer, etc.). In one implementation, the server 130 may be included in the content sharing platform 120. The server 130 may include an information identification component 140. In one implementation, the information identification component 140 determines how to decorate embedded graphic representations on social shares with metadata to present to a user of the content sharing platform 120. In one implementation, the decorated embedded graphic representation (s) provided to a user is a UI component that allows the user to decide whether to consume the content item on one or more social networks (which may include the content sharing platform 120 as well as other external social networks 150 external to the content sharing platform 120). The determination of how to decorate embedded graphic representations on social shares can depend on the content item associated with the embedded graphic representation and the current statistical information for the content item. Further description of the information identification component 140 and its specific functions is described in more detail below with respect to FIG. 2.

Although implementations of the disclosure are discussed in terms of content sharing platforms and decorating representations of a content item on a social network, implementations may also be generally applied to any type of network providing connections between users. Implementations of the disclosure are not limited to content sharing platforms or social networks.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
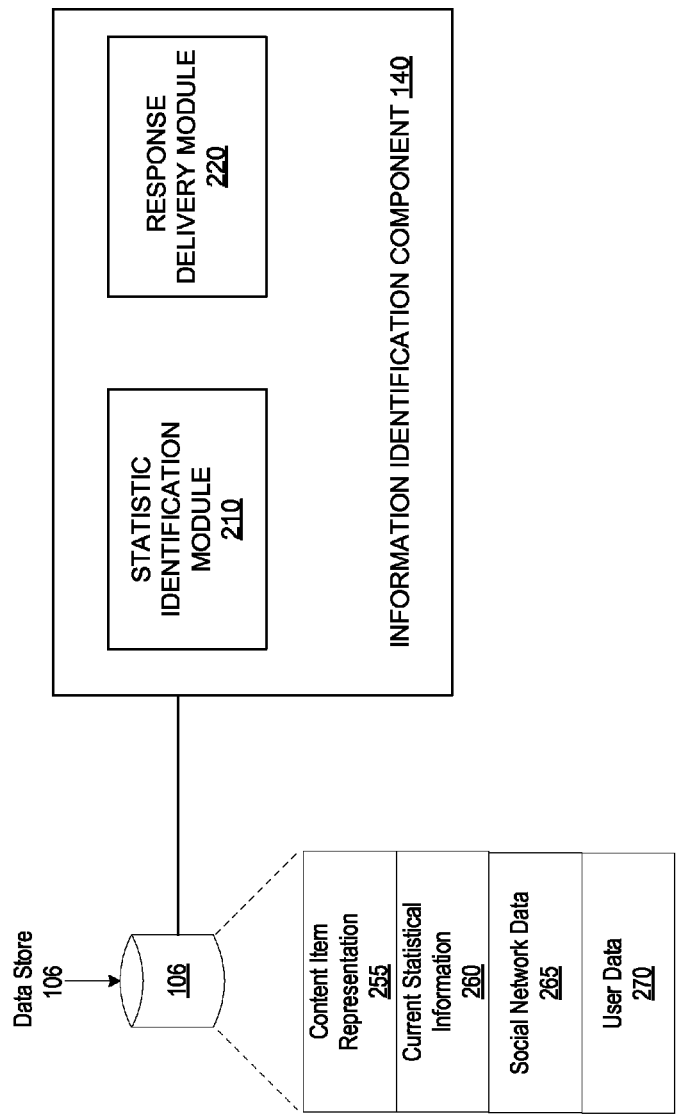
FIG. 2 is a block diagram illustrating an information identification component in accordance with one implementation of the disclosure.

FIG. 2 is a block diagram illustrating an information identification component 140 in accordance with one implementation of the disclosure. In one implementation, the information identification component 140 includes a statistic identification module 210 and a response delivery module 220. More or less components may be included in the information identification component 140 without loss of generality. For example, two of the modules may be combined into a single module, or one of the modules may be divided into two or more modules. In one implementation, one or more of the modules may reside on different computing devices (e.g., different server computers).

The information identification component 140 is communicatively coupled to the data store 106. For example, the information identification component 140 may be coupled to the data store 106 via a network (e.g., via network 105 as illustrated in FIG. 1). In another example, the information identification component 140 may be coupled directly to a server where the information identification component 140 resides (e.g., may be directly coupled to server 130). The data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). The data store 106 includes content item representations 255, current statistic data 260, social network data 265, and user data 270.

As discussed above, the information identification component 140 determines how to decorate an embedded graphic representation with metadata on a social share in a user interface. Determining how to decorate an embedded graphic representation with metadata may include receiving a request for a content item, identifying current statistical information for the content item, and providing a response to the request that includes the representation and data indicative of the current statistical information.

In one implementation, the statistic identification module 210 identifies current statistical information for a content item in response to receiving a request for the content item from a social network that hosts a UI document (e.g., a web page or a mobile device application) including a social share referencing or embedding the content item. The request for the content item can be a request for a representation (e.g., thumbnail) of the content item. A social share can be a comment, a post, or any other content shared by a user of the social network with one or more other users of the social network and presented in a social network UI. The statistic identification module 210 can identify the current statistical information for the content item from a data store, such as from current statistical information 260 in data store 106. Current statistical information 260 can include dynamic data associated with the content item, such as a number of likes associated with the content item, a number of dislikes associated with the content item, a number of comments associated with the content item, a number of views associated with the content item, rating information associated with the content, ranking information associated with the content item, identification information (e.g., viewer name, login name, etc.) for one or more viewers associated with a user that have viewed the content item, identification information (e.g., viewer name, login name, etc.) for one or more viewers associated with the user that have liked the content item, trending information for the content item (e.g., whether the content item is currently trending up, down, etc.), upload information for the content item (e.g., newly uploaded, timestamp of when the content was uploaded, etc.), etc.

In one embodiment, the statistic identification module 210 identifies the current statistical information for the content item from current statistical information 260 based on the social network from which the request was received using social network data, such as social network data 265 in data store 106. Social network data 265 can include metrics associated with the social network, such as a metric of success associated with the social network, or other information about the social network, such as a name of the social network, information about users of the social network, implementation details for the social network, etc. that can be used to determine which statistical information to identify.

In an alternate embodiment, the statistic identification module 210 identifies the current statistical information for the content item from current statistical information 260 based on a metric associated with the content sharing platform. In another alternate embodiment, the statistic identification module 210 identifies the current statistical information for the content item from current statistical information 260 based on the user associated with the request for the content item using user data, such as user data 270 in data store 106. User data 270 can include information about a current user of the social network, such as a name of the user, an age of the user, a geographic location of the user, viewers or friends associated with the user, channel subscriptions for the user, websites or people that the user follows, etc.

In another alternate embodiment, the statistic identification module 210 identifies the current statistical information for the content item from current statistical information 260 by identifying interactive elements from current statistical information 260, such as graphical components that describe the content item.

The response delivery module 220 can deliver a response to the social network. The response delivery module 220 can deliver the response by obtaining a representation for the content item from content item representations 255 and the current statistical information identified by the statistic identification module 210 and providing the representation and data indicative of the current statistical information to the social network.

Figure 3:
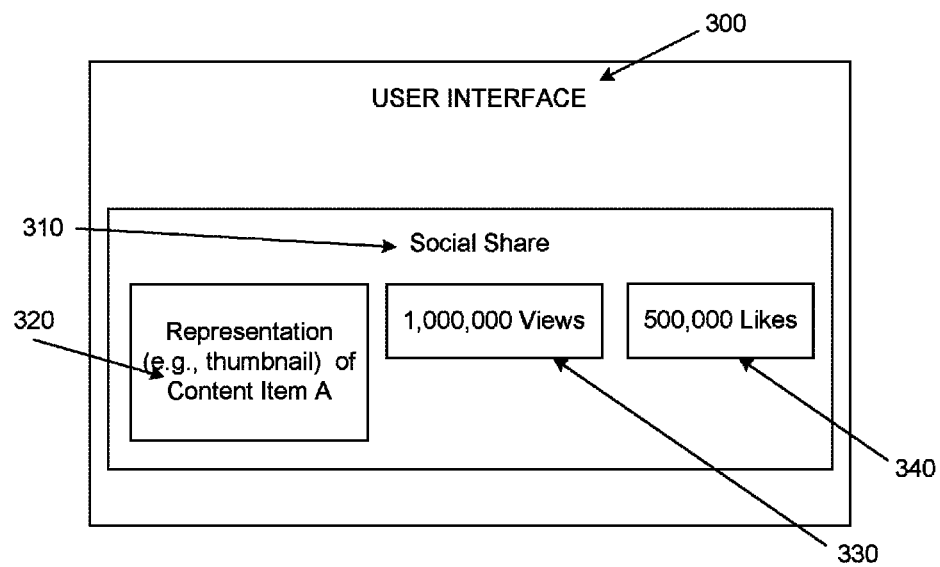
FIG. 3 is an example screenshot illustrating a user interface decorating embedded graphic representations on social shares with metadata, in accordance with one embodiment of the present disclosure.

FIG. 3 is an example screenshot illustrating a UI displaying an embedded graphic representation decorated with metadata on a social share in accordance with one embodiment of the present disclosure. The user interface 300 is provided to a user viewing a social share referencing a content item at a client device. For example, the user interface 300 is provided to a user when the user requests a social network page that includes the social share. The user interface 300 can be provided to a user via a web browser, an application (e.g., a mobile app), embedded in a third party web page, etc.

The user interface 300 includes a social share 310. The social share 310 includes a representation 320, a first current statistic 330 and a second current statistic 340. The representation 320 can be an embedded graphic representation for a content item. For example, the representation A can be a thumbnail of content item A. In one embodiment, the representation 320 is presented as part of or within an iframe (not shown). When a user activates (e.g., clicks and/or selects) the representation 320, the content item associated with the activated representation 320 may be presented as part of the user interface 300. For example, user interface 300 may present a media player (not shown in the figures) that may be used to consume or play the content item associated with the activated representation 320. The first current statistic 330 can be a first current statistic identified from current metadata for the content item. The first current statistic 330 can represent a real-time dynamic value for the content item included in the social share 310. For example, the first current statistic 330 is a current value for the number of views for the content item A, such as 1,000,000 views. The second current statistic 340 can be a first current statistic identified from current metadata for the content item. The second current statistic 340 can represent a real-time dynamic value for the content item included in the social share 310. For example, the second current statistic 340 is a current value for the number of likes for the content item A, such as 500,000 likes. In one embodiment, the first current statistic 330 and/or the second current statistic 340 are presented as part of or within an iframe. The iframe presenting the first current statistic 330 and/or the second current statistic 340 may be the same iframe or a different iframe than the iframe presenting the representation 320.

Figure 4:
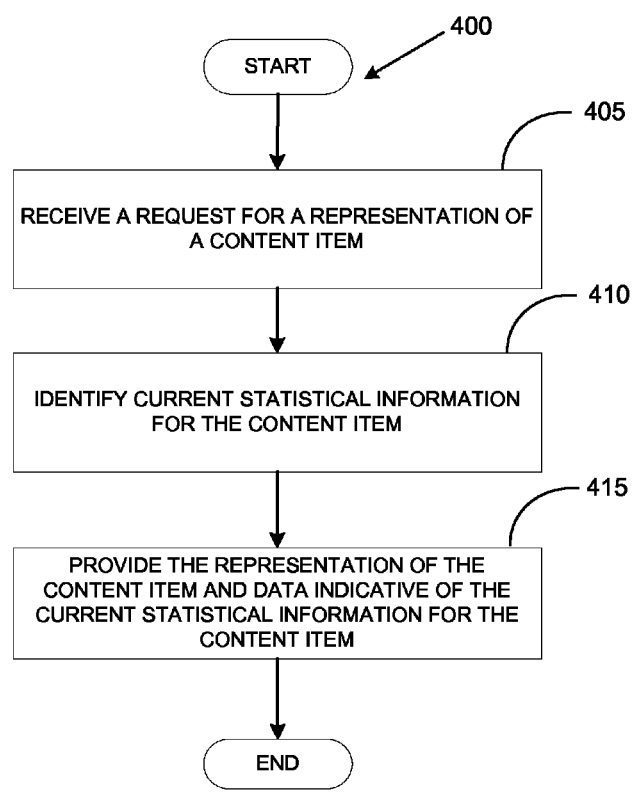
FIG. 4 is a flow diagram illustrating one embodiment for a method of decorating embedded graphic representations on social shares with metadata, in accordance with one embodiment of the present disclosure.

FIG. 4 is a flow diagram illustrating an embodiment for a method 400 of decorating embedded graphic representations on social shares with metadata. The method 400 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 400 is performed by a server (e.g., the server 130 of FIG. 1).

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by information identification module 120, as shown in FIG. 1.

At block 405, processing logic receives a request for a content item. The request for the content item can be a request for a representation (e.g., thumbnail) of the content item. The content item can be associated with a social network. For example, the content item can be referenced in a social share included on a social network page associated with a user. The social network page can be a personal webpage of the user and can include pictures, videos, music, and other media items to share. A social share can be a comment, a post, or any other context that is associated with the social network page. The content item can otherwise be associated with a social network without departing from the scope of the present disclosure.

In one embodiment, processing logic receives the request for the content item when a user requests a social network page that includes or embeds the content item. In an alternate embodiment, processing logic receives the request for the content item when a user associates the content item with the social network, such as by posting the content item to a social network page on or hosted by the social network.

In one embodiment, the request for the content item includes a link to the content item. The link to the content item may have been previously provided to the social network by a content sharing platform that stores or otherwise has access to the content item. The content sharing platform can provide the link for the content item to the social network when a reference to the content item is included in the social network page. For example, the link is provided to the social network when the content item is posted or otherwise included (e.g., embedded) in a social network page associated with the social network. The link can be used by the social network to populate the social network page when the social network page is loaded by a web browser or application. For example, user A uploads video A to the content sharing platform and user B later posts video A to user B's social network page. In this example, the content sharing platform will provide a link for video A to the social network when user B posts video A to user B's social network page.

The target of the link can be a representation for the content item, such as a thumbnail of the content item. The representation of the content item can be an embedded graphic representation when the content item is embedded in the social network page. In one embodiment, the link can be a metadata embed URL that represents an inline frame (iframe) that will render metadata representing the content item. In one embodiment, an iframe may be a document container that is used to embed/insert another document within a current document. For example, an iframe may be used to insert/embed a first web page into a second web page. In another example, an iframe may be used to insert/embed a media player (e.g., an application, program, app, software module, etc., that plays or consumes content items) into a web page. The iframe that will render the metadata representing the content item can include a title of the content item, a description of the content item, a depiction of the content item uploader (e.g., linkable name and profile image of the content item), and current statistical information for the content item. The iframe that will render the metadata representing the content item may also include a graphic representation of the content item in some embodiments. In an alternate embodiment, the link can be a Uniform Resource Locator (URL) for the content item or a representation of the content item (e.g., thumbnail URL), such as an identifier for a thumbnail associated with the content item and may not include additional information for the content item.

An example of HTML code that may be used to present the metadata representing the content item and/or the content item in the social share of the user may be the following exemplary iframe HTML code:

<iframe src="//csp.site/embed/v=urvdPutOthY"></iframe>

The social network may use the iframe HTML code to present an iframe that includes a representation of the content item and/or the metadata (e.g., current statistical information) associated with the content item. The content presented in the iframe (e.g., the representation of the content item and/or the current statistical information for the content item) may be provided by the content sharing platform when a media viewer presents and/or displays (e.g., renders) the iframe that is included in the social share of the user. In another embodiment, the data indicative of the content item and/or the current statistical information for the content item may be other data, such as a representation (e.g., images, icons, frames, etc.) or text (e.g., title, description, etc.). For example, instead of providing the iframe HTML code, the content sharing platform may provide an image (e.g., a representation) and text (e.g., a title, current statistical information, etc.) of the content item that is included in the social share of the user. The social network may use the representation and text when providing the content item in the social share.

At block 410, processing logic identifies current statistical information for the content item. The current statistical information can include dynamic data associated with the content item, such as a number of likes associated with the content item, a number of dislikes associated with the content item, a number of comments associated with the content item, a number of views associated with the content item, rating information associated with the content, rating information associated with the content item, rating information associated with the content item, ranking information associated with the content item, identification information (e.g., viewer name, login name, etc.) for one or more viewers associated with a user that have viewed the content item, identification information (e.g., viewer name, login name, etc.) for one or more viewers associated with the user that have liked the content item, trending information for the content item (e.g., whether the content item is currently trending up, down, etc.), upload information for the content item (e.g., newly uploaded, timestamp of when the content was uploaded, etc.), etc. In an optional embodiment, processing logic can aggregate the dynamic data associated with the content item with additional data from one or more external sites that reference or include the content item. The external site can be the social network from which the request is received, another social network, or other external site (e.g., a blog, news site, etc.). For example, video A is included on a content sharing platform A, a social network site B, and a blog C, and includes 3000 views, 2000 views, and 1000 views respectively. In this example, processing logic can aggregate the views from the content sharing platform and one or more of the external sites, such as the number of views from site A and site B (3000+2000=5000 views), the number of views from site A and site C (3000+1000=4000 views), and the number of views from site A, site B, and site C (3000+2000+1000=6000 views).

If the request for the content item includes a metadata embed URL, processing logic can identify the current statistical information from the metadata representing the content item that is associated with the metadata embed URL. If the request for the content item includes a URL for the representation of the content item, processing logic can identify the current statistical information by obtaining the current statistical information from the content sharing platform. For example, if processing logic receives a request for video A that includes the thumbnail URL http://www.contentsharingplatform.com/videoAthumbnail, processing logic obtains the current statistical information for video A from www.contentsharingplatform.com.

In one embodiment, processing logic identifies the current statistical information for the content item based on the social network from which the request was received. In one such embodiment, processing logic identifies the current statistical information based on a metric of success associated with the social network. In this embodiment, processing logic can determine the metric of success by maintaining information for a metric of success for each social network, by obtaining the metric of success from the social network, etc. For example, processing logic receives a request from social network A for a content item and processing logic determines the metric of success for social network A is time on the site. In this example, processing logic can identify the length of the content item as the current statistical information. In another example, processing logic receives a request from social network B for a content item and processing logic determines the metric of success for social network B is a number of views, processing logic can identify the number of views of the content item as the current statistical information. In another such embodiment, processing logic identifies the current statistical information based on a metric requested by the social network. In this embodiment, the social network can provide the metric to processing logic as part of the request, as a separate request, etc.

In another alternate embodiment, processing logic identifies the current statistical information for the content item based on a metric associated with the content sharing platform. For example, processing logic identifies the number of views of the content item as the current statistical information when the metric associated with the content sharing platform is a number of views.

In an alternate embodiment, processing logic identifies the current statistical information for the content item based on the user associated with the request for the content item. Processing logic can identify the current statistical information for the content item based on the user by determining the user associated with the request, accessing personalized information associated with the user, and identifying the current statistical information based on the personalized information associated with the user. Processing logic can determine the user associated with the request based on metadata included as part of the request or in addition to the request. Processing logic can access personalized information associated with the user by obtaining the personalized information from a repository, from the social network, etc. The personalized information associated with the user can include personal information about the user, such as the name of the user, the age of the user, a geographic location of the user, etc. The personalized information associated with the user can further include viewers or friends associated with the user, such as friends included in a social circle of the user, viewers that the user likes or has otherwise expressed interest in, etc. Processing logic can identify the current statistical information based on the personalized information associated with the user by customizing the current metadata associated with the content item to the user. For example, if the current metadata includes the number of likes for the content item and the personalized information associated with the user includes friends of the user, processing logic can identify the current statistical information to include the number of likes for the content item and a visual representation (e.g., identifier, picture, etc.) of the user's friends who liked the video. In another example, if the current metadata includes the number of views for the content item and the personalized information associated with the user includes friends of the user, processing logic can identify the current statistical information to include the number of views for the content item and a visual representation (e.g., identifier, picture, etc.) of the user's friends who viewed the video. In yet another example, the current data associated with the content item includes channel information for the content item and includes a subscribe button that indicates whether or not the user is subscribed to the channel on the content sharing platform.

In another alternate embodiment, processing logic identifies the current statistical information to include interactive elements. For example, processing logic identifies the current statistical information that includes extra graphical components which describe whether the content item is currently trending or is newly uploaded.

Other alternate embodiments for identifying the current statistical information can be used without departing from the scope of the present disclosure.

At block 415, processing logic provides data indicative of the representation of the content item and data indicative of the current statistical information associated with the content item to the social network. In some embodiments, data indicative of the representation is a graphic representation of the content item. The representation for the reference can be a thumbnail, a graphic or other representation associated with the content item. In some embodiments, data indicative of the current statistical information is the current statistical information for the content item. For example, for a request for a social share including video A, which has 10 views and 5 likes, the response includes a thumbnail for video A, 10 views, and 5 likes. In another embodiment, the data indicative of the representation of the content item is an iframe HTML code, a representation, an image, text, etc. and the data indicative of the current statistical information associated with the content item is an iframe HTML code, a representation, an image, text, etc.

Figure 5:
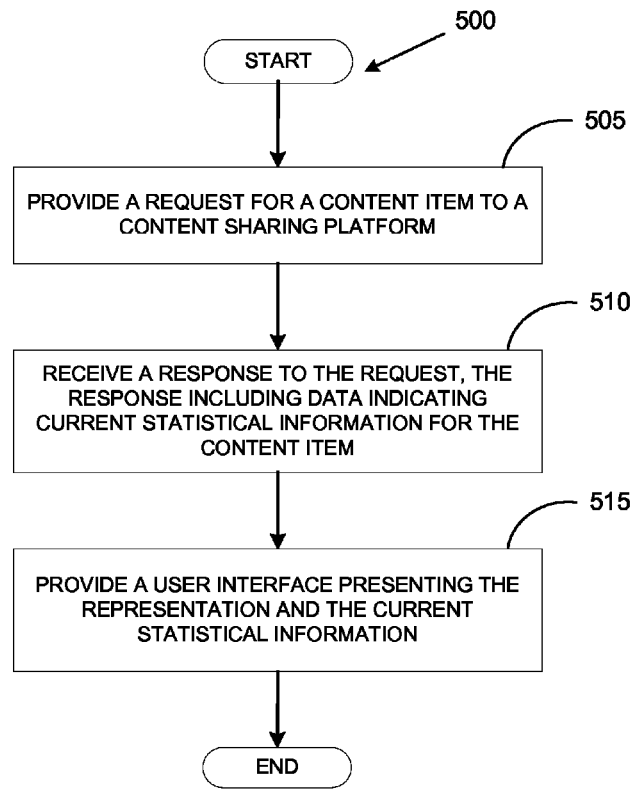
FIG. 5 is a flow diagram illustrating one embodiment for a method of displaying an embedded graphic representation decorated with metadata on a social share in a user interface, in accordance with one embodiment of the present disclosure.

FIG. 5 is a flow diagram illustrating an embodiment for a method 500 of displaying an embedded graphic representation decorated with metadata on a social share in a user interface. The method 500 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 500 is performed by a server (e.g., the server 130 of FIG. 1).

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 500 may be performed by information identification module 120, as shown in FIG. 1.

At block 505, processing logic provides a request for a content item to a content sharing platform. The request for the content item can be a request for a representation (e.g., thumbnail) of the content item. The content item can be associated with a social network and processing logic can provide the request for the content item to a content sharing platform. For example, the content item can be referenced in a social share included on a social network page associated with a user. The social network page can be a personal webpage of the user and can include pictures, videos, music, and other media items to share. A social share can be a comment, a post, or any other context that is associated with the social network page. The content item can otherwise be associated with a social network without departing from the scope of the present disclosure.

In one embodiment, processing logic provides the request for the content item when a user requests a social network page that includes or embeds the content item. In one such embodiment, processing logic can obtain a metadata embed URL for the content item that represents an inline frame (iframe) that will render metadata representing the content item. In this embodiment, processing logic may have previously scraped the metadata embed URL from the social network page and taken a snapshot of the metadata embed URL when the content item was included in the social network page, such that the metadata embed URL does not need to be fetched each time the content item needs to be served. In another such embodiment, processing logic can manually construct the metadata embed URL by obtaining an identifier for the content item from the original content item URL and constructing the metadata embed URL using the identifier for the content item. In an alternate embodiment, the link can be a Uniform Resource Locator (URL) for the content item or a representation of the content item (e.g., thumbnail URL), such as an identifier for a thumbnail associated with the content item and may not include additional information for the content item.

In an alternate embodiment, processing logic provides the request for the content item when a user associates the content item with the social network, such as by posting the content item to a social network page on or hosted by the social network.

In one embodiment, the request for the content item includes a link to the content item. The link to the content item may have been previously provided to the processing logic by a content sharing platform that stores or otherwise has access to the content item. The link can be used by the processing logic to populate the social network page when the social network page is loaded by a web browser or application and can be cached by the processing logic.

The target of the link can be a representation for the content item, such as a thumbnail of the content item. The representation of the content item can be an embedded graphic representation when the content item is embedded in the social network page. In one embodiment, the link can be an inline frame (iframe) URL for the content item. In an alternate embodiment, the link can be a Uniform Resource Locator (URL) for a representation of the content item (e.g., thumbnail URL).

At block 510, processing logic receives a response to the request for the content item. In one embodiment, processing logic receives the response to the request from a content sharing platform that stores or otherwise has access to the content item. In an alternate embodiment, processing logic receives the response to the request from a memory store (e.g., cache) associated with a social share on a social network. The response can include data indicative of the content item and the current statistical information (e.g., iframe HTML code, representations, text, images, etc., as discussed above). The data indicative of the content item can include a representation for the content item and current statistical information for the content item. The representation for the content item can be a graphic representation for the content item, such as a thumbnail, or any other representation for the content item. The current statistical information can include dynamic data associated with the content item, such as a number of likes associated with the content item, a number of dislikes associated with the content item, a number of comments associated with the content item, a number of views associated with the content item, rating information associated with the content item, ranking information associated with the content item, identification information (e.g., viewer name, login name, etc.) for one or more viewers associated with a user that have viewed the content item, ranking information for the content item, identification information (e.g., viewer name, login name, etc.) for one or more viewers associated with the user that have liked the content item, trending information for the content item (e.g., whether the content item is currently trending up, down, etc.), upload information for the content item (e.g., newly uploaded, timestamp of when the content was uploaded, etc.), etc.

Figure 6:
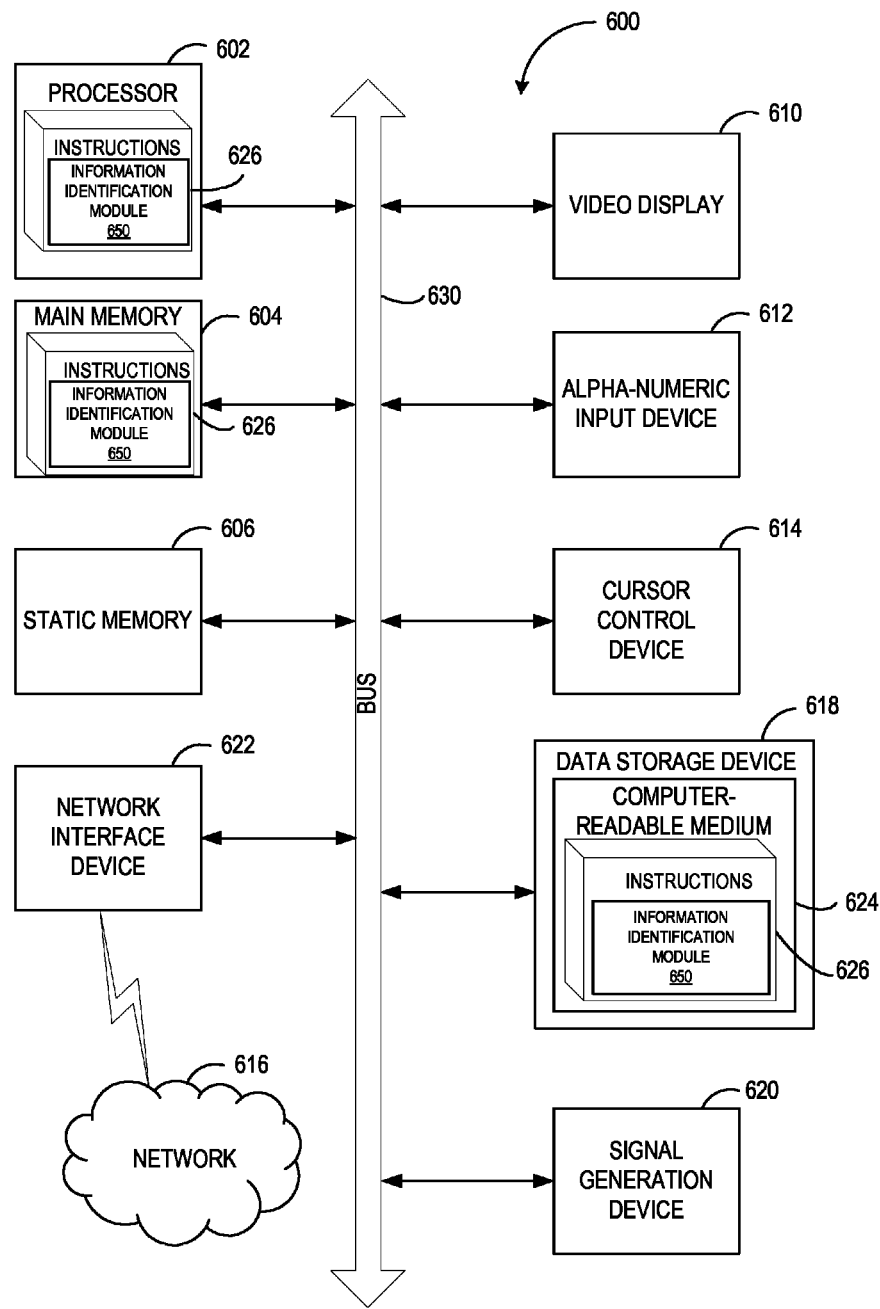
FIG. 6 is a block diagram of an exemplary computer system that may perform one or more of the operations described herein.

At block 515, processing logic provides a UI presenting the representation and the current statistical information, such as on a social network page associated with the social network. Processing logic can provide the UI by rendering the iframe FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 618 may include a computer-readable storage medium 624 on which is stored one or more sets of instructions 626 (e.g., software) embodying any one or more of the methodologies or functions described herein. The instructions 626 may also reside, completely or at least partially, within the main memory 604 and/or within the processor 602 during execution thereof by the computer system 600, the main memory 604 and the processor 602 also constituting computer-readable storage media. The instructions 626 may further be transmitted or received over a network 616 via the network interface device 622.

In one embodiment, the instructions 626 include instructions for an information identification module 650, which may correspond to an information identification component 140 of FIG. 1, and/or a software library containing methods that decorates embedded graphic representations on social shares with metadata. While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "computing", "calculating", "obtaining", "identifying", "presenting," "receiving," "modifying", "identifying", "selecting", "displaying", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
  receiving, by a processing device of a content sharing platform, a request of a user of the content sharing platform to share a content item hosted by the content sharing platform with one or more contacts of the user on a social network platform, the social network platform being separate from the content sharing platform;
  sending, by the content sharing platform, an identifier of the content item hosted by the content sharing platform to the social network platform;
  receiving, by the content sharing platform, a request from the social network platform for a graphic representation of the content item hosted by the content sharing platform, the request comprising the identifier of the content item hosted by the content sharing platform, wherein the graphic representation of the content item is to be included in a social share displayed on a graphical user interface (GUI) of the social network platform for the one or more contacts of the user of the content sharing platform;

identifying, by the content sharing platform, current statistical information associated with the content item, the current statistical information comprising combined counts of various interactions with the content item by a plurality of viewers of the content item via the content sharing platform and the social network platform; and providing, by the content sharing platform, the graphic representation of the content item and the current statistical information associated with the content item to the social network platform for presentation in the social share displayed on the GUI of the social network platform for the one or more contacts of the user of the content sharing platform, wherein the social share is to present the graphic representation of the content item with the current statistical information associated with the content item as a post of the user, and wherein the graphic representation of the content item, when activated by one of the one or more contacts of the user of the content sharing platform, causes playback of the content item via the content sharing platform.

2. The method of claim 1, wherein the current statistical information comprises at least one of: a number of likes associated with the content item, a number of dislikes associated with the content item, a number of comments associated with the content item, a number of views associated with the content item, a rating of the content item, a ranking of the content item, viewers associated with a user that have viewed the content item, viewers associated with the user that have liked the content item, trending information for the content item, or upload information for the content item.

3. The method of claim 1, wherein the identifier of the content item is a link to the content item, and wherein the link is associated with the graphic representation of the content item.

4. The method of claim 3, wherein the link is an inline frame Uniform Resource Locator (URL) associated with the graphic representation for the content item.

5. The method of claim 1, wherein identifying the current statistical information comprises identifying the current statistical information in view of the social network platform.

6. The method of claim 1, wherein identifying the current statistical information comprises identifying the current statistical information in view of the user associated with the request.

7. The method of claim 1, wherein the content item is a video on the content sharing platform and wherein the current statistical information is at least one of a number of likes for the video at the time of the request or a number of views for the video at the time of the request.

8. A method comprising:

receiving, by a processing device of a social network platform, an identifier of a content item hosted by a content sharing platform and shared by a user of the content sharing platform with one or more contacts of the user on the social network platform, the social network platform being separate from the content sharing platform;

providing, by the social network platform, a request for a graphic representation of the content item to the content sharing platform, the request comprising the identifier of the content item, wherein the graphic representation of the content item is to be included in a social share displayed on a graphical user interface of the social network platform;

receiving, by the social network platform, a response to the request from the content sharing platform, wherein the response to the request comprises current statistical information associated with the content item, the current statistical information comprising combined counts of various interactions with the content item by a plurality of viewers of the content item via the content sharing platform and the social network platform; and providing, by the social network platform, the graphical user interface including the social share presenting the graphic representation of the content item and the current statistical information associated with the content item, wherein the social share presents the graphic representation of the content item with the current statistical information associated with the content item as a post of the user, and wherein the graphic representation of the content item, when activated by one of the one or more contacts of the user of the content sharing platform, causes playback of the content item via the content sharing platform.

9. The method of claim 8, wherein the current statistical information comprises at least one of: a number of likes associated with the content item, a number of dislikes associated with the content item, a number of comments associated with the content item, a number of views associated with the content item, a rating of the content item, a ranking of the content item, viewers associated with a user that have viewed the content item, viewers associated with the user that have liked the content item, trending information associated with the content item, or upload information associated with the content item.

10. A non-transitory computer readable storage medium having instructions that, when executed by a processing device, cause the processing device to perform operations comprising:

receiving, by a content sharing platform, a request of a user of the content sharing platform to share a content item hosted by the content sharing platform with one or more contacts of the user on a social network platform, the social network platform being separate from the content sharing platform;

sending, by the content sharing platform, an identifier of the content item hosted by the content sharing platform to the social network platform;

receiving, by the content sharing platform, a request from the social network platform for a graphic representation of the content item hosted by the content sharing platform, the request comprising the identifier of the content item, wherein the graphic representation of the content item is to be included in a social share displayed on a graphical user interface (GUI) of the social network platform for the one or more contacts of the user of the content sharing platform;

identifying, by the content sharing platform, current statistical information associated with the content item, the current statistical information comprising combined counts of various interactions with the content item by a plurality of viewers of the content item via the content sharing platform and the social network platform; and providing, by the content sharing platform, the graphic representation of the content item and the current statistical information associated with the content item to the social network platform for presentation in the social share displayed on the GUI of the social network platform for the one or more contacts of the user of the content sharing platform, wherein the social share is to present the graphic representation of the content item with the current statistical information associated with the content item as a post of the user, and wherein the graphic representation of the content item, when activated by one of the one or more contacts of the user of the content sharing platform, causes playback of the content item via the content sharing platform.

11. The non-transitory computer readable storage medium of claim 10, wherein the current statistical information comprises at least one of: a number of likes associated with the content item, a number of dislikes associated with the content item, a number of comments associated with the content item, a number of views associated with the content item, a rating of the content item, a ranking of the content item, viewers associated with a user that have viewed the content item, viewers associated with the user that have liked the content item, trending information for the content item, or upload information for the content item.

12. The non-transitory computer readable storage medium of claim 10, wherein the identifier of the content item is a link to the content item, and wherein the link is associated with the graphic representation of the content item.

13. The non-transitory computer readable storage medium of claim 10, wherein identifying the current statistical information comprises identifying the current statistical information in view of the social network platform.

14. The non-transitory computer readable storage medium of claim 10, wherein the content item is a video on the content sharing platform and wherein the current statistical information is at least one of a number of likes for the video at the time of the request or a number of views for the video at the time of the request.

15. A non-transitory computer readable storage medium having instructions that, when executed by a processing device, cause the processing device to perform operations comprising:
receiving, by a social network platform, an identifier of a content item hosted by a content sharing platform and shared by a user of the content sharing platform with one or more contacts of the user on the social network platform, the social network platform being separate from the content sharing platform;
providing, by the social network platform, a request for a graphic representation of the content item to the content sharing platform, the request comprising the identifier of the content item, wherein the graphic representation of the content item is to be included in a social share displayed on a graphical user interface of the social network platform;
receiving, by the social network platform, a response to the request from the content sharing platform, wherein the response to the request comprises current statistical information associated with the content item, the current statistical information comprising combined counts of various interactions with the content item by a plurality of viewers of the content item via the content sharing platform and the social network platform; and
providing, by the social network platform, the graphical user interface including the social share presenting the graphic representation of the content item and the current statistical information associated with the content item, wherein the social share presents the graphic representation of the content item with the current statistical information associated with the content item as a post of the user, and wherein the graphic representation of the content item, when activated by one of the one or more contacts of the user of the content sharing platform, causes playback of the content item via the content sharing platform.

16. A computing device comprising:
a memory; and
a processing device of a content sharing platform, wherein the processing device is coupled to the memory, wherein the processing device is to:
receive a request of a user of the content sharing platform to share a content item hosted by the content sharing platform with one or more contacts of the user on a social network platform, the social network platform being separate from the content sharing platform;
send an identifier of the content item hosted by the content sharing platform to the social network platform;
receive a request from the social network platform for a graphic representation of the content item hosted by the content sharing platform, the request comprising the identifier of the content item, wherein the graphic representation of the content item is to be included in a social share displayed on a graphical user interface (GUI) of the social network platform for the one or more contacts of the user of the content sharing platform;
identify current statistical information associated with the content item, the current statistical information comprising combined counts of various interactions with the content item by a plurality of viewers of the content item via the content sharing platform and the social network platform; and
provide the graphic representation of the content item and the current statistical information associated with the content item to the social network platform for presentation in the social share displayed on the GUI of the social network platform for the one or more contacts of the user of the content sharing platform, wherein the social share is to present the graphic representation of the content item with the current statistical information associated with the content item as a post of the user, and wherein the graphic representation of the content item, when activated by one of the one or more contacts of the user of the content sharing platform, causes playback of the content item via the content sharing platform.

17. The computing device of claim 16, wherein the current statistical information comprises at least one of: a number of likes associated with the content item, a number of dislikes associated with the content item, a number of comments associated with the content item, a number of views associated with the content item, a rating of the content item, a ranking of the content item, viewers associated with a user that have viewed the content item, viewers associated with the user that have liked the content item, trending information for the content item, or upload information for the content item.

18. The computing device of claim 16, wherein the identifier of the content item is a link to the content item, and wherein the link is graphic representation of the content item.

19. The computing device of claim 16, wherein identifying the current statistical information comprises identifying the current statistical information in view of the social network platform.

20. The computing device of claim 16, wherein the content item is a video on the content sharing platform and wherein the current statistical information is at least one of a number of likes for the video at the time of the request or a number of views for the video at the time of the request.

* * * * *